(12) United States Patent
Zamanzadeh et al.

(10) Patent No.: US 9,972,030 B2
(45) Date of Patent: May 15, 2018

(54) SYSTEMS AND METHODS FOR THE SEMANTIC MODELING OF ADVERTISING CREATIVES IN TARGETED SEARCH ADVERTISING CAMPAIGNS

(71) Applicant: Criteo S.A., Paris (FR)

(72) Inventors: Behzad Zamanzadeh, Tarzana, CA (US); Stephen John Zimmerman, Jr., Los Angeles, CA (US); Cartic Ramakrishnan, Los Angeles, CA (US)

(73) Assignee: Criteo S.A., Paris (FR)

( * ) Notice: Subject to any disclaimer, the term of this patent is extended or adjusted under 35 U.S.C. 154(b) by 0 days. days.

(21) Appl. No.: 13/792,718

(22) Filed: Mar. 11, 2013

(65) Prior Publication Data

US 2014/0257967 A1    Sep. 11, 2014

(51) Int. Cl.
 *G06Q 30/00* (2012.01)
 *G06Q 30/02* (2012.01)

(52) U.S. Cl.
 CPC ................. *G06Q 30/0256* (2013.01)

(58) Field of Classification Search
 CPC . G06Q 30/0269; G06Q 30/0277; G06Q 40/08
 See application file for complete search history.

(56) References Cited

U.S. PATENT DOCUMENTS

| | | | |
|---|---|---|---|
| 4,839,853 A | 6/1989 | Deerwester et al. | |
| 6,405,162 B1 | 6/2002 | Segond et al. | |
| 7,527,352 B2 | 5/2009 | Kaneko et al. | |
| 7,580,926 B2 | 8/2009 | Kapur et al. | |
| 7,730,024 B2 * | 6/2010 | Harinath | G06F 21/6227 707/608 |
| 8,103,650 B1 | 1/2012 | Kauchak et al. | |
| 8,311,997 B1 | 11/2012 | Kauchak et al. | |
| 8,335,719 B1 | 12/2012 | Quraishi et al. | |

(Continued)

FOREIGN PATENT DOCUMENTS

JP    2002092488 A  *  3/2002  ............. G06F 17/60

OTHER PUBLICATIONS

Bellini et al. (Mar. 26, 2015). Modeling performing arts metadata and relationships in content service for institutions. https://link.springer.com/article/10.1007/s00530-014-0366-0. Retrieved online Dec. 24, 2017.*

*Primary Examiner* — James A Reagan
(74) *Attorney, Agent, or Firm* — KPPB LLP

(57) ABSTRACT

Systems and methods for the semantic modeling of advertising creatives included in targeted search advertising campaigns in accordance with embodiments of the invention are disclosed. In one embodiment, an advertising creative generation device includes a processor, an advertising creative generation application, at least one semantic model and performance data, wherein the an advertising creative generation application configures the processor to obtain a set of existing advertising creatives, where at least one of the existing advertising creatives comprises an existing concept, identify at least one existing advertising strategy pattern, determine performance data for the at least one existing advertising strategy pattern based on the performance data, identify at least one performance pattern based on the performance data for the at least one existing advertising strategy pattern, and generate at least one recommended advertising strategy.

20 Claims, 4 Drawing Sheets

(56) References Cited

U.S. PATENT DOCUMENTS

| | | |
|---|---|---|
| 8,407,094 B1 | 3/2013 | Axe et al. |
| 8,527,352 B2 | 9/2013 | Chatwin et al. |
| 8,694,362 B2 | 4/2014 | Zimmerman et al. |
| 8,738,426 B2 | 5/2014 | Zimmerman et al. |
| 2005/0055271 A1 | 3/2005 | Axe et al. |
| 2005/0080776 A1 | 4/2005 | Colledge et al. |
| 2005/0114198 A1 | 5/2005 | Koningstein et al. |
| 2006/0069784 A2 | 3/2006 | Hsu et al. |
| 2007/0179832 A1 | 8/2007 | Reich |
| 2008/0097842 A1 | 4/2008 | Tirumala et al. |
| 2008/0104032 A1 | 5/2008 | Sarkar et al. |
| 2009/0254512 A1 | 10/2009 | Broder et al. |
| 2010/0049504 A1 | 2/2010 | Rajan et al. |
| 2010/0169312 A1 | 7/2010 | Malden et al. |
| 2010/0185687 A1 | 7/2010 | Chung et al. |
| 2010/0268600 A1 | 10/2010 | Banko et al. |
| 2011/0035272 A1 | 2/2011 | Bhatt et al. |
| 2011/0106642 A1 | 5/2011 | Hassan et al. |
| 2011/0196737 A1 | 8/2011 | Vadlamani et al. |
| 2011/0258049 A1* | 10/2011 | Ramer ............. G06F 17/30867 705/14.66 |
| 2011/0295678 A1 | 12/2011 | Seldin et al. |
| 2012/0036015 A1 | 2/2012 | Sheikh |
| 2012/0066057 A1 | 3/2012 | Ramer et al. |
| 2012/0095828 A1 | 4/2012 | Evankovich et al. |
| 2012/0239488 A1 | 9/2012 | Zimmerman et al. |
| 2012/0303444 A1 | 11/2012 | Vadlamani et al. |
| 2012/0324347 A1 | 12/2012 | Monroe et al. |
| 2013/0046640 A1 | 2/2013 | Thierer et al. |
| 2013/0110627 A1 | 5/2013 | Guha |
| 2013/0262979 A1 | 10/2013 | Gu et al. |
| 2013/0297419 A1 | 11/2013 | Zimmerman, Jr. et al. |
| 2014/0046756 A1 | 2/2014 | Wang et al. |
| 2014/0114744 A1 | 4/2014 | Koningstein |
| 2014/0229281 A1 | 8/2014 | Zimmerman et al. |
| 2014/0257973 A1 | 9/2014 | Zamanzadeh et al. |
| 2014/0258001 A1 | 9/2014 | Ramaksrihnan et al. |
| 2014/0258002 A1 | 9/2014 | Zimmerman et al. |
| 2014/0278917 A1 | 9/2014 | Zimmerman, Jr. et al. |
| 2014/0278985 A1 | 9/2014 | Ramakrishnan et al. |
| 2014/0279037 A1 | 9/2014 | Zimmerman et al. |
| 2016/0098751 A1 | 4/2016 | Zimmerman et al. |
| 2016/0132926 A1 | 5/2016 | Zimmerman, Jr. et al. |

* cited by examiner

SYSTEMS AND METHODS FOR THE SEMANTIC MODELING OF ADVERTISING CREATIVES IN TARGETED SEARCH ADVERTISING CAMPAIGNS

FIELD OF THE INVENTION

The present invention relates to targeted search advertising and more specifically to the modeling of advertising creatives for use in targeted search advertising campaigns.

BACKGROUND

The term e-commerce is used to refer to the buying and selling of products or services over electronic systems such as the Internet and other computer networks. The amount of trade conducted via e-commerce has grown extraordinarily with widespread Internet usage. As a result, a variety of websites have been established to offer goods and services.

Search engines are useful tools for locating specific pages of information on the World Wide Web and are increasingly used to locate goods and services. As a result, many websites use search advertising/search engine marketing to attract visitors to product, service, and/or category landing pages. Search advertising describes the placement of online advertisements adjacent or amongst the search results returned by a search engine in response to a specific search query. Search engine marketing typically involves paying for a specific online advertisement or creative to be featured in or adjacent to the search results provided in response to a specific query. Typically, the position of an advertisement within the returned search results is a function of the bid scaled by a quality factor that measures the relevance of the creative and landing page combination to the search query. Accordingly, the provider of the search engine is incentivized to feature relevant keyword/advertisement/landing page combinations so that users will select featured advertisements and increase the revenue generated by the search engine provider. In the context of paid search advertising, the term keyword refers to both a single word and a specific combination of words or keyword components.

When a website includes a large number of products or services, the process of building and managing a paid search advertising campaign can be quite complex. Many search engines provide the ability to upload an entire advertising campaign including one or more creatives that target a set of keywords, and associated bids to be used when the display of the creative is triggered by specific keywords. For example, Google, Inc. of Mountain View, Calif., defines an Ad Group file format that enables advertisers to upload paid search advertising campaigns.

SUMMARY OF THE INVENTION

Systems and methods for the semantic modeling of advertising creatives included in targeted search advertising campaigns in accordance with embodiments of the invention are disclosed. In one embodiment, an advertising creative generation device includes a processor, a memory connected to the processor and configured to store an advertising creative generation application, semantic model storage configured to store at least one semantic model comprising data describing relationships between advertising creatives, keywords, concepts described using categories and attribute-value pairs, and targeting data constituting a plurality of advertising strategy patterns, and performance data storage configured to store performance data for advertising creatives, keywords, and targeting data comprising performance data for a plurality of advertising strategy patterns, wherein the an advertising creative generation application configures the processor to obtain a set of existing advertising creatives, associated keywords, and advertising targets, where at least one of the existing advertising creatives comprises an existing concept, identify at least one existing advertising strategy pattern by matching a relationship between the set of existing creatives, associated keywords and advertising targets with one of the set of advertising strategy patterns within the at least one semantic model, determine performance data for the at least one existing advertising strategy pattern based on the performance data with respect to the advertising creative, keywords, and targeting data forming each of the at least one existing advertising strategy, identify at least one performance pattern based on the performance data for the at least one existing advertising strategy pattern, and generate at least one recommended advertising strategy based on the identified performance pattern and a subset of the set of existing advertising creatives, where at least one recommended advertising strategy comprises at least one updated concept based on the existing concept and the identified performance pattern.

In another embodiment of the invention, the performance data comprises campaign specific performance data for specific advertising creatives and associated keywords and targeting data.

In an additional embodiment of the invention, the performance data is selected from the group consisting of impressions, click-through rates, and conversion rates.

In yet another additional embodiment of the invention, the advertising creative generation application further configures the processor to generate advertising creatives based on the existing creatives and the at least one recommended advertising strategy.

In still another additional embodiment of the invention, at least one of the generated advertising creatives modifies at least one of the existing creatives based on the at least one recommended advertising strategy.

In yet still another additional embodiment of the invention, the advertising creative generation application further configures the processor to transmit the generated advertising creatives to a device selected from the group consisting of an advertising server system and a search engine provider.

In yet another embodiment of the invention, the advertising creative generation application further configures the processor to identify at least one performance pattern based on global performance data, where the global performance data includes performance data for advertising creatives, keywords, and targeting data comprising performance data for a plurality of advertising strategy patterns across a plurality of existing targeted search advertising campaigns.

In still another embodiment of the invention, the advertising creative generation application further configures the processor to identify at least one performance pattern by performing a regression analysis based on the at least one existing advertising strategy pattern and the global performance data.

In yet still another embodiment of the invention, the advertising creative generation application further configures the processor to generate at least one recommended advertising strategy that is not included in the at least one existing advertising strategy pattern and the global performance data.

In still another additional embodiment of the invention, the advertising creative generation application further configures the processor to generate at least one recommended advertising strategy based on the identified performance pattern, a subset of the set of existing advertising creatives, and at least one of the at least one sematic model.

Still another embodiment of the invention includes a method for generating advertising creatives including obtaining a set of existing advertising creatives, associated keywords, and advertising targets using an advertising creative generation device, where at least one of the existing advertising creatives comprises an existing concept, identifying at least one existing advertising strategy pattern by matching a relationship between the set of existing creatives, associated keywords and advertising targets with one of the set of advertising strategy patterns within the at least one semantic model using the advertising creative generation device, determining performance data for the at least one existing advertising strategy pattern based on the performance data with respect to the advertising creative, keywords, and targeting data forming each of the at least one existing advertising strategy using the advertising creative generation device, identifying at least one performance pattern based on the performance data for the at least one existing advertising strategy pattern using the advertising creative generation device, and generating at least one recommended advertising strategy based on the identified performance pattern and a subset of the set of existing advertising creatives using the advertising creative generation device, where at least one recommended advertising strategy comprises at least one updated concept based on the existing concept and the identified performance pattern.

In yet another additional embodiment of the invention, the performance data comprises campaign specific performance data for specific advertising creatives and associated keywords and targeting data.

In still another additional embodiment of the invention, the performance data is selected from the group consisting of impressions, click-through rates, and conversion rates.

In yet still another additional embodiment of the invention, generating advertising creatives further includes generating advertising creatives based on the existing creatives and the at least one recommended advertising strategy using the advertising creative generation device.

In yet another embodiment of the invention, at least one of the generated advertising creatives modifies at least one of the existing creatives based on the at least one recommended advertising strategy.

In still another embodiment of the invention, generating advertising creatives further includes transmitting the generated advertising creatives to a device using the advertising creative generation device, where the device is selected from the group consisting of an advertising server system and a search engine provider.

In yet still another embodiment of the invention, generating advertising creatives further includes identifying at least one performance pattern based on global performance data using the advertising creative generation device, where the global performance data includes performance data for advertising creatives, keywords, and targeting data comprising performance data for a plurality of advertising strategy patterns across a plurality of existing targeted search advertising campaigns.

In yet another additional embodiment of the invention, generating advertising creatives further includes identifying at least one performance pattern by performing a regression analysis based on the at least one existing advertising strategy pattern and the global performance data using the advertising creative generation device.

In still another additional embodiment of the invention, generating advertising creatives further includes generating at least one recommended advertising strategy that is not included in the at least one existing advertising strategy pattern and the global performance data using the advertising creative generation device.

In yet still another additional embodiment of the invention, generating advertising creatives further includes generating at least one recommended advertising strategy based on the identified performance pattern, a subset of the set of existing advertising creatives, and at least one of the at least one sematic model using the advertising creative generation device.

DETAILED DESCRIPTION

Figure 1:
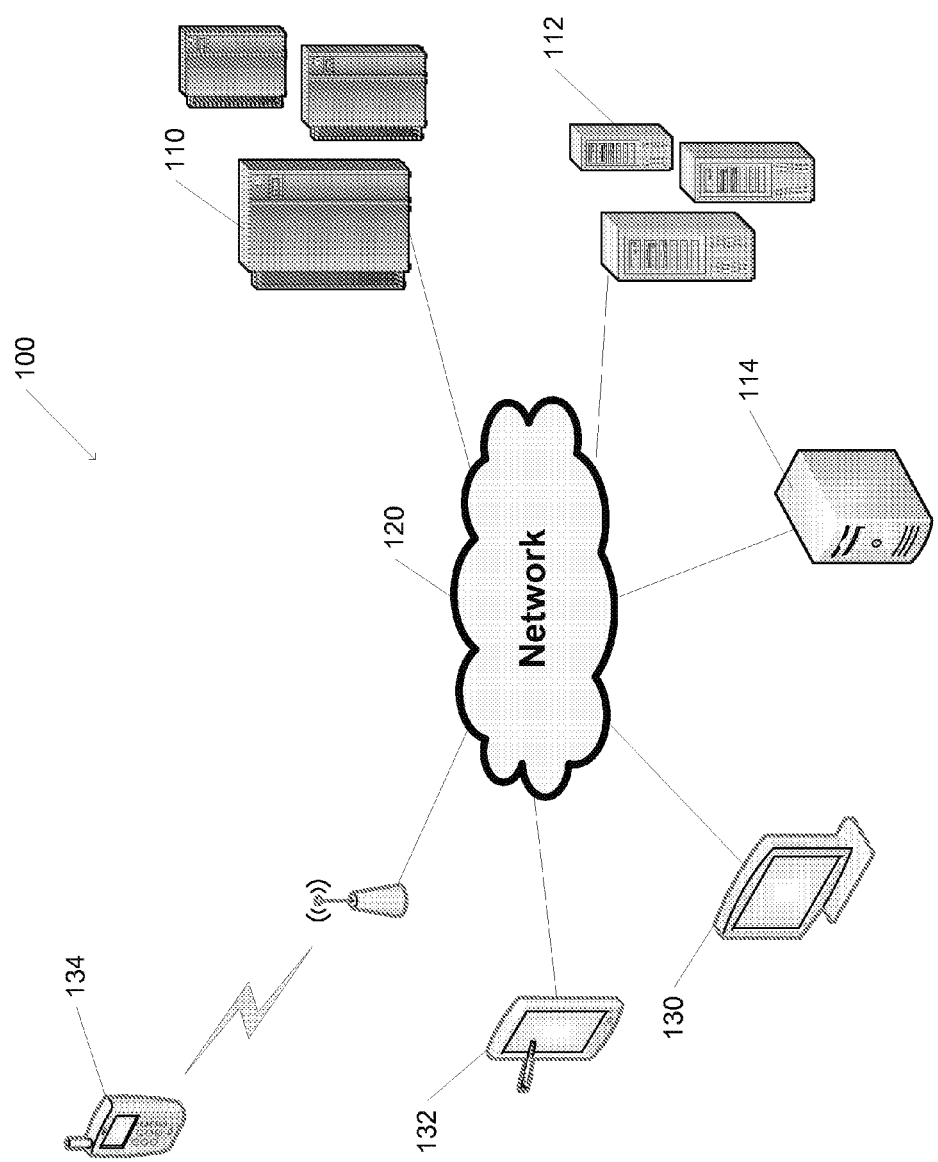
FIG. 1 is a conceptual illustration of a targeted advertising system in accordance with an embodiment of the invention.

Turning now to the drawings, systems and methods for the semantic modeling of advertising creatives utilized in targeted search advertising campaigns in accordance with embodiments of the invention are disclosed. Targeted search advertising campaigns in accordance with embodiments of the invention include a plurality of advertisements describing one or more products and/or services that are the subject(s) of the targeted search advertising campaign. The advertisements are targeted towards keywords and/or phrases (and/or the intent described by the keywords and/or phrases) provided by a search engine provider. Systems and methods for creating targeted search advertising campaigns that can be utilized in accordance with embodiments of the invention are disclosed in U.S. patent application Ser. No. 13/424,373, titled "Taxonomy Based Targeted Search Advertising" to Zimmerman et al., filed Mar. 19, 2012, the entirety of which is incorporated by reference. In many embodiments, generating a targeted search advertising campaign utilizes a sematic model. The term semantic model is used to describe a particular scheme for classifying products and/or services. Collectively products and/or services (indeed any object, person, idea, or action) can be referred to as a concept and, in many embodiments, concepts can be defined in terms of categories and attribute value pairs. In this way, a semantic model used to build targeted search advertising campaigns can also include elements of a taxonomy and/or an ontology in the sense that the possible attributes of classified concepts can also be specified, as can the relationships (including hierarchical relationships) between those attributes. In several embodiments, a semantic model is constructed based upon keywords used by people searching for the specific products and/or services that are featured in an advertising campaign. The semantic model can also be used to identify relationships between keyword components and the categories and attributes within the semantic model and these relationships used to identify potentially relevant keywords for use in targeting a search advertising campaign with respect to specific concepts defined by the categories and attributes within the semantic model. Effective or optimal advertising creatives can then be automatically generated based upon the attributes of offers that are likely to perform well with respect to specific queries targeted by the search advertising campaign.

A creative is the specific advertisement that is displayed as part of the search engine results and different creatives can be displayed with respect to the same landing page in response to different targeted search queries. Advertising creative generation devices are configured to generate advertising creatives based on existing creatives associated with an existing advertising campaign, a semantic model, and performance data related to the existing advertising campaign. Using the semantic model, advertising creative generation devices analyze the performance of the existing creatives and determine recommended advertising strategies based on the performance of the existing creatives. Using the recommended advertising strategies, advertising creative generation devices generate advertising creatives that are designed to demonstrate improved performance relative to some or all of the existing creatives. In a variety of embodiments, advertising creative generation devices utilize global performance data generated by analyzing the performance of a number of targeted search advertising campaigns to tailor the recommended advertising strategy and/or the generated advertising creatives based on successful strategies identified in other targeted search advertising campaigns. The global performance data includes a variety of data, including advertising creatives, advertising patterns, advertising strategies, and the associated performance data; other data can be includes in the global performance data as appropriate to the requirements of a specific application in accordance with embodiments of the invention.

Systems and methods for generating advertising creatives used in targeted search advertising campaigns in accordance with embodiments of the invention are discussed below.

Targeted Search Advertising Systems

Targeted advertising systems are configured to deliver advertisements contained in or generated from advertising campaigns to user devices. Advertising systems utilized in search engine advertising are configured to deliver advertisements corresponding to the intent expressed in a search query. Targeted search advertising systems in accordance with many embodiments of the invention are configured to create targeted search advertising campaigns using advertising creatives targeted toward the search terms used to search for the products and/or services that are the target of the search advertising campaign and deploy those targeted search advertising campaigns to search engine providers. A diagram of a targeted search advertising system in accordance with an embodiment of the invention is shown in FIG. 1. The targeted advertising system 100 includes an advertising server system 110, an advertising creative generation device 112, a search engine provider 114, and user devices including computers 130, tablets 132, and mobile phones 134 configured to communicate via a network 120. In a variety of embodiments, the network 120 is the Internet. In a variety of embodiments, the advertising server system 110 and/or the advertising creative generation device 112 are implemented using a single server system. In several embodiments, the advertising server system 110 and/or the advertising creative generation device 112 are implemented using multiple server systems.

The search engine provider 114 is configured to present targeted advertisements to the user devices based on keywords and/or phrases contained in search queries provided by the user devices to the search engine provider 114. The advertising creative generation device 112 is configured to obtain existing advertising creatives, analyze the existing creatives based on one or more semantic models and/or the performance of the existing advertising creatives to generate a targeted advertising strategy, and generate updated advertising creatives based on the targeted advertising strategy. In many embodiments, the advertising creative generation device 112 is configured to utilize global performance data in the generation of updated advertising creatives. The advertising server system 110 is configured to obtain the updated advertising creatives from the advertising creative generation device 112, generate and/or update targeted search advertising campaigns based on the scored keywords and/or phrases, and provide the generated campaigns to the search engine provider 114.

Although a specific architecture of a targeted advertising system in accordance with embodiments of the invention are discussed above and illustrated in FIG. 1, a variety of architectures, including user devices not specifically named and other methods of serving targeted search advertising campaign information to user devices, can be utilized in accordance with embodiments of the invention. Systems and methods for generating advertising creatives utilized in targeted search advertising campaigns are discussed below.

Advertising Creative Generation Devices

Figure 2:
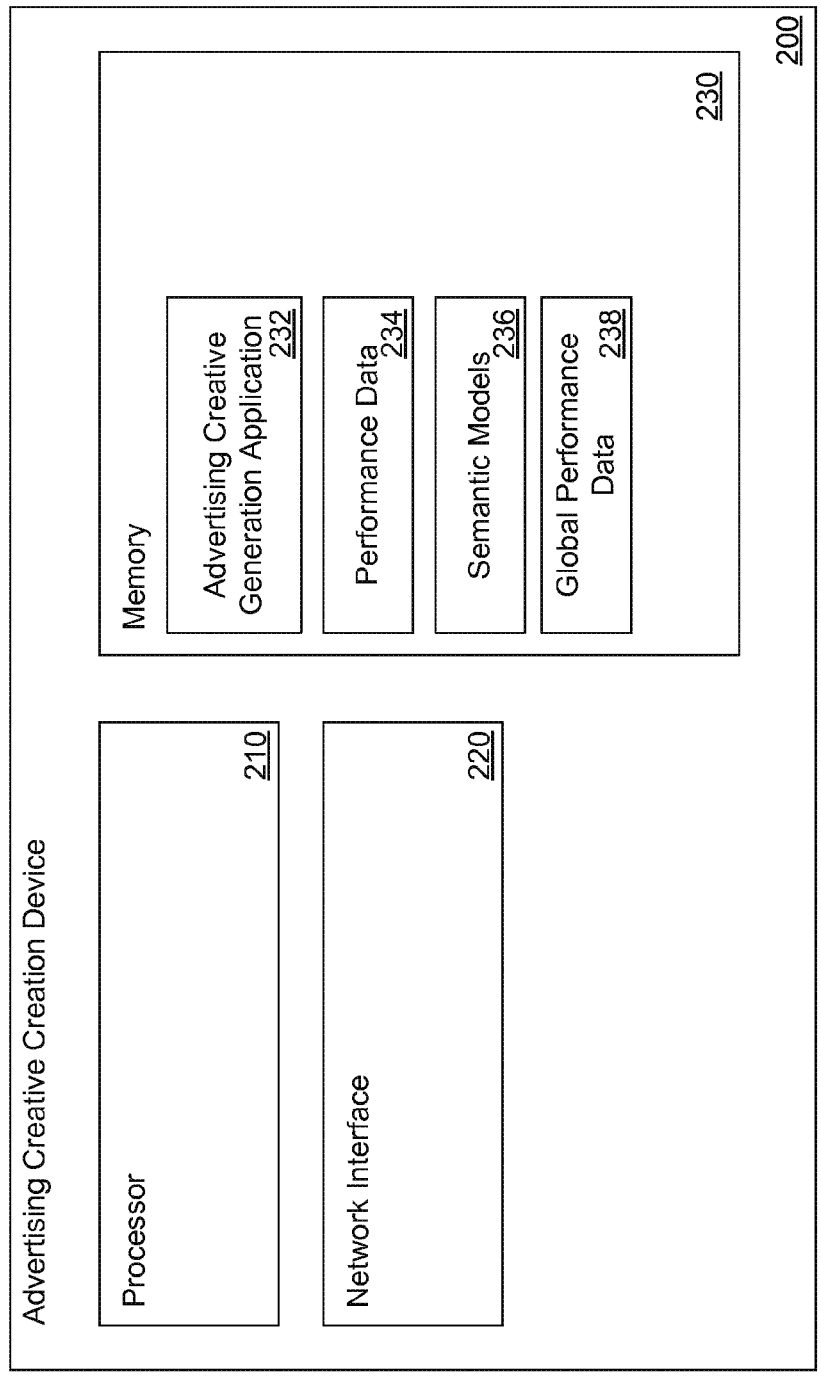
FIG. 2 is a conceptual illustration of an advertising creative generation device in accordance with an embodiment of the invention.

Advertising creative generation devices in accordance with embodiments of the invention are configured to generate advertising creatives based on the performance of existing creatives associated with a targeted search advertising campaign. A conceptual illustration of an advertising creative generation device in accordance with an embodiment of the invention is shown in FIG. 2. The advertising creative generation device 200 includes a processor 210 in communication with memory 230. The advertising creative generation device 200 also includes a network interface 220 configured to send and receive data over a network connection. In a number of embodiments, the network interface 220 is in communication with the processor 210 and/or the memory 230. In several embodiments, the memory 230 is any form of storage configured to store a variety of data, including, but not limited to, an advertising creative generation application 232, performance data 234, semantic models 236, and/or global performance data 238. In many embodiments, the advertising creative generation application 232, performance data 234, semantic models 236, and/or global performance data 238 are stored using an external server system and received by the advertising creative generation device 200 using the network interface 220.

The processor 210 is configured by the advertising creative generation application 232 to obtain existing creatives associated with a targeted search advertising campaign. The advertising creative generation application 232 configures the processor 210 to determine existing strategies associated with the existing creatives based on one or more of the semantic models 236. In many embodiments, a variety of existing strategies, such as messaging strategies and targeting strategies can be determined based on one or more semantic models 236, such as semantic messaging models and semantic targeting models. However, any strategies and/or semantic models can be utilized as appropriate to the requirements of a specific application in accordance with embodiments of the invention. The advertising creative generation application 232 further configures the processor 210 to determine the performance of the existing strategies based on performance data 234 and identify patterns in the performance of the existing strategies. In a number of embodiments, identifying patterns utilizes the global performance data 238. Based on the identified patterns, the advertising creative generation application 232 configures the processor 210 to recommend one or more advertising strategies, such as messaging strategies, marketing strategies, and targeting strategies, to generate advertising creatives that are designed to perform better than one or more of the existing creatives. A targeting strategy can include (but is not limited to) a strategy concerning the specific keywords and demographics used to target the display of search advertising based upon specific relationships between keywords and/or other targeting information with categories and attributes within a taxonomy captured within a semantic model. A messaging strategy can include (but is not limited to) a strategy concerning the specific keywords and phrases that are displayed within a creative targeted to a specific target in response to a query expressing a particular intent. A marketing strategy can include (but is not limited to) the specific offers that are targeted within a targeted search advertising campaign. Other strategies can be recommended and utilized to generate advertising creatives as appropriate to the requirements of a specific application in accordance with embodiments of the invention. In several embodiments, the updated advertising creatives are utilized by an advertising server system to create and/or update a targeted search advertising campaign.

Although a specific architecture for an advertising creative generation device in accordance with an embodiment of the invention is conceptually illustrated in FIG. 2, any of a variety of architectures, including those which store data or applications on disk or some other form of storage and are loaded into memory at runtime and systems that are distributed across multiple physical servers, can also be utilized in accordance with embodiments of the invention. Methods for generating advertising creatives in accordance with embodiments of the invention are discussed below.

Generating Advertising Creatives

Figure 3:
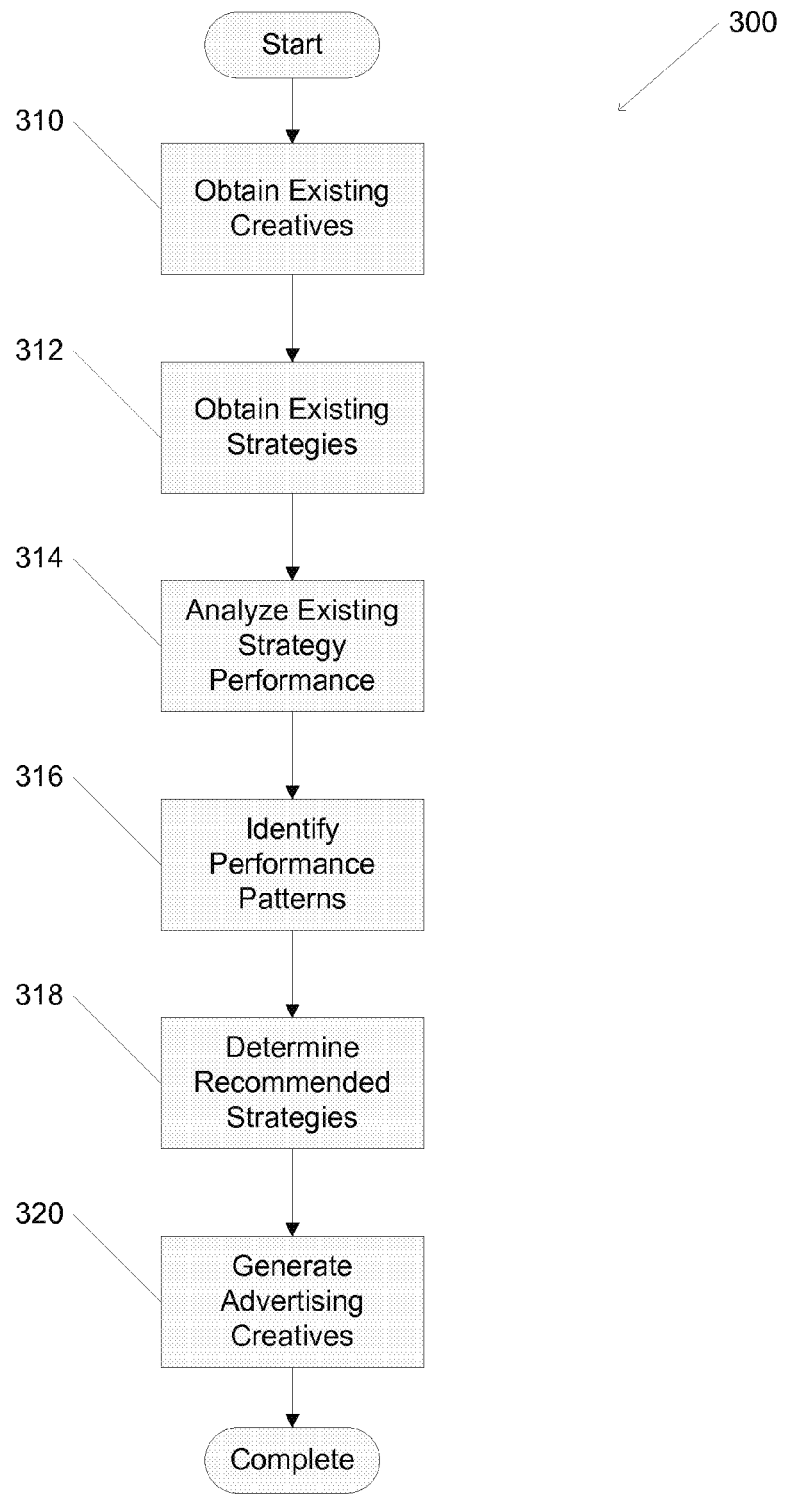
FIG. 3 is a flow chart illustrating a process for modeling advertising creatives for use in targeted search advertising campaigns in accordance with an embodiment of the invention.

Advertising creatives within a targeted search advertising campaign are typically targeted toward concepts (including products and/or services). The performance of the advertising creatives is a measure of the success of targeted search advertising campaign determined by one or more of a variety of metrics, including advertising creatives served, impressions, click-through rates, costs associated with the creatives, and/or conversion rates. Advertising creative generation devices in accordance with embodiments of the invention are configured to analyze the performance of advertising creatives and suggest updated and/or additional creatives to improve the performance of the advertising creative based upon the observed performance patterns within a targeted search campaign and/or across a benchmark of targeted search campaigns. A process for generating advertising creatives in accordance with an embodiment of the invention is illustrated in FIG. 3. The process 300 includes obtaining (310) existing creatives. Existing advertising strategies are obtained (312). The performance of the existing strategies is analyzed (314) and performance patterns are identified (316). Recommended strategies are determined (318) and advertising creatives are generated (320).

In many embodiments, existing creatives and/or existing advertising strategies are obtained (310, 312) from a targeted search advertising campaign maintained by an advertising server system, a search engine provider, and/or manually. Existing creatives and existing advertising strategies can, however, be obtained (310, 312) from any source as appropriate to the requirements of a specific application in accordance with embodiments of the invention. In a number of embodiments, the obtained (312) existing strategies are based on one or more semantic models. In several embodiments, the performance of the existing strategies is determined (314) based on the semantic model(s) and/or performance data associated with the obtained (310) existing creatives and/or the obtained (312) existing strategies. The performance data can be obtained from a variety of sources, including, but not limited to, advertising server systems and search engine providers. The performance data can includes a variety of information related to the existing creatives and strategies, such as click-through rates, impressions, views, costs, and any other information as appropriate to the requirements of a specific application in accordance with embodiments of the invention.

In many embodiments, patterns in the determined (314) performance information are identified (316) to identify dimensions in the determined (314) performance information that provide insights into the performance of the existing strategies. Various processes, including those described below, can be utilized to identify (316) performance patterns within the existing strategies as appropriate to the requirements of a specific application in accordance with embodiments of the invention. In a number of embodiments, one or more strategies are recommended (318) based on the identified (316) performance patterns. In several embodiments, one or more strategies are recommended (318) based on one or more semantic models related to the targeted advertising campaign. The process of generating an advertising creative involves selecting a target and building an advertising creative for the target. The target typically comprises a target keyword and may include additional targeting information including, but not limited to, geographic location and/or demographic characteristics of a user. The creative typically includes information that can be provided to a search engine provider for the purpose of rendering an advertisement within search results returned by the search engine provider in response to the targeted query. In a variety of embodiments, the recommended (318) strategies involve modifying and/or replacing the keywords, attributes, targets, concepts, and/or templates utilized in the generation of the advertising creatives in order to generate advertising creatives targeted towards expected queries targeted by the advertising creatives. Many strategies, including messaging strategies, targeting strategies, and marketing strategies, can be recommended (318) and utilized to generate (320) advertising creatives as appropriate to the requirements of a specific application in accordance with embodiments of the invention. A targeting strategy recommendation can be generated using a semantic model by identifying the most specific set of product attributes that match the intent expressed in the one or more search terms in received search queries and using these in the generating advertising creatives. A messaging strategy recommendation can be generated using a semantic model by identifying the most historically effective creative messaging phrases associated with the intent expressed in one or more search queries and using these phrases in the targets and/or concepts associated with the advertising creative. A marketing strategy recommendation can be generated using a semantic model by identifying the promotional scheme phrases that, when combined with message and target phrases, have historically demonstrated a particular level of performance as measured by a click-through rate and/or a conversion rate, and using these combinations as building blocks of the advertising creative.

In a variety of embodiments, advertising creatives are generated (320) based on the existing creatives and/or new advertising creatives are generated (320). The advertising creatives can be generated (320) automatically via an advertising creative generation device, via a human intelligence task, or a combination of machine and manual processes. In several embodiments, the performance data is utilized in generating (320) advertising creatives.

Although a specific process for generating advertising creatives in accordance with embodiments of the invention is described above with respect to FIG. 3, any number of processes can be utilized in accordance with embodiments of the invention. Processes for determining advertising performance patterns in accordance with embodiments of the invention are described below.

Identifying Advertising Performance Patterns

Figure 4:
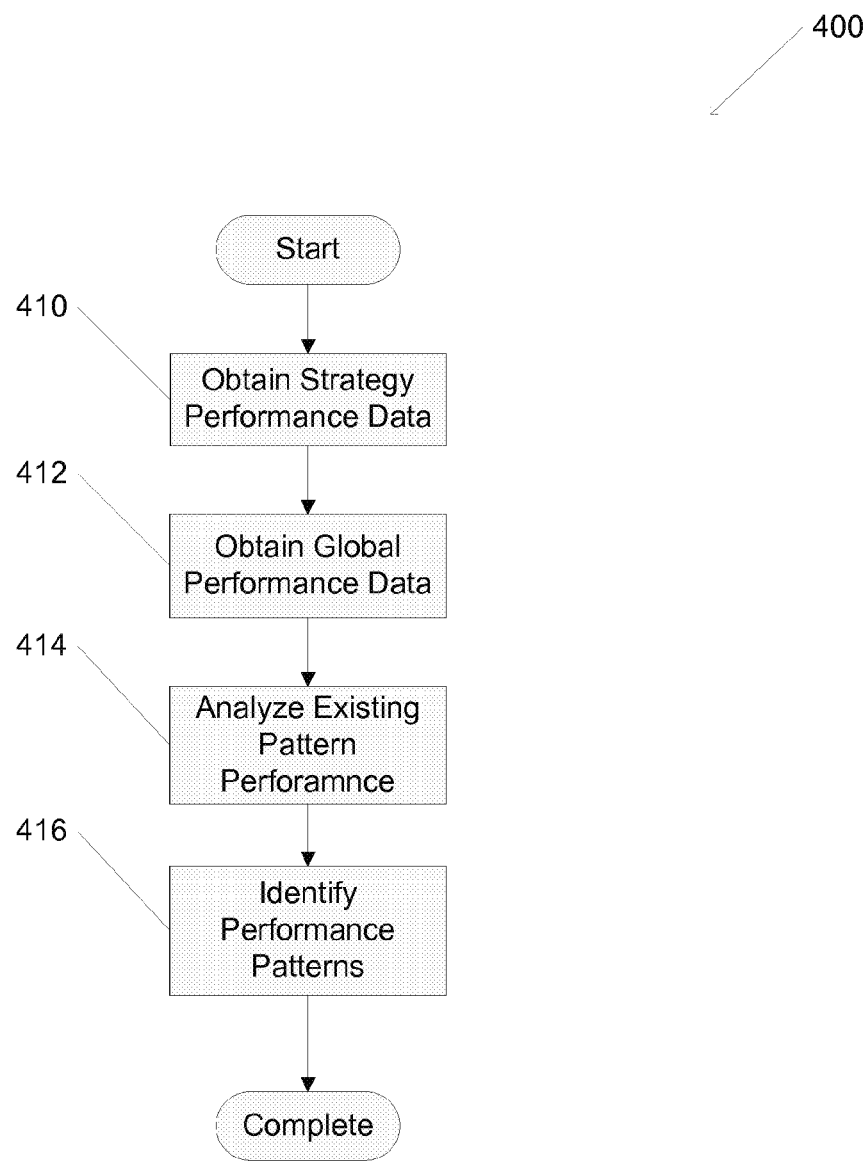
FIG. 4 is a flow chart illustrating a process for generating advertising patterns in accordance with an embodiment of the invention.

By analyzing the performance of advertising strategies associated with a targeted search advertising campaign against a global set of performance data, potential improvements in the advertising strategies can be identified. Advertising creative generation devices in accordance with embodiments of the invention are configured to utilize global performance data in generating recommended advertising patterns in targeted search advertising campaigns. A process for identifying advertising patterns in accordance with an embodiment of the invention is illustrated in FIG. 4. The process 400 includes obtaining (410) advertising strategy performance data. Global performance data is obtained (412). Existing pattern performance is analyzed (414) and performance patterns are identified (416).

In a number of embodiments, advertising strategy performance data is obtained (410) and existing pattern performance is analyzed (414) utilizing processes similar to those described above. In several embodiments, global performance data is obtained (412) from a search engine provider and/or an advertising server system. In many embodiments, the global performance data is related to a plurality of targeted search advertising campaigns and associated semantic models that capture the relationships between categories and attributes of concepts offered within the campaign, and the targets and creatives utilized within the campaign. In a variety of embodiments, the global performance data is associated with the same genre of product (e.g. the same advertising or marketing vertical) as the existing advertising campaign associated with the obtained (410) strategy performance data. In many embodiments, analyzing (414) existing pattern performance can be implemented using a regression analysis between the existing pattern performance and the global performance data. The regression analysis can be performed using a variety of dimensions related to the patterns. The analysis (414) can also be performed using any analysis technique appropriate to the requirements of a specific application, such as (but not limited to) support vector machines and principal component analysis. In a number of embodiments, the identified (416) performance patterns can be used by a recommendation engine to generate recommendations with respect to modifications to one or more of the analyzed (414) existing patterns based on the global performance data. In several embodiments, the identified (416) performance patterns are recommended on the basis that they are successful advertising patterns (measured using any of a variety of performance criterion) that exist in the global performance data and are not present in the existing patterns of the analyzed targeted search advertising campaign. In certain embodiments, the identified (416) performance patterns include new advertising patterns not present in either the existing patterns or the global performance data.

A specific process for generating advertising patterns in accordance with an embodiment of the invention is discussed above with respect to FIG. 4; however, a variety of processes can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An advertising creative generation device, comprising:

a processor;

a memory readable by the processor and storing an advertising creative generation application;

semantic model storage storing semantic models, wherein a set of the semantic models comprises data describing concepts, advertising creatives, and semantic relationships between the concepts and the advertising creatives; and performance data storage storing performance data for advertising creatives and a plurality of advertising strategies;

wherein the advertising creative generation application that when read by the processor directs the processor to:

obtain a set of existing advertising creatives for a set of associated concepts and a set of existing advertising strategies wherein each advertising strategy in the set of existing advertising strategies is based on the set of semantic models;

store the set of existing advertising creatives using the memory;

determine advertisement performance data describing the performance of the set of existing advertising creatives and the set of existing advertising strategies based on the performance data in the performance data storage associated with the set of existing advertising creatives and the set of semantic models upon which the advertising strategies in the set of existing advertising strategies is based;

store the advertisement performance data using the memory;

identify performance pattern data describing at least one performance pattern that describes a pattern between the performance of the set of existing advertising creatives and semantic relationships between the advertising creatives and the associated concepts;

store the performance pattern data using the memory;

generate at least one recommended advertising strategy for a particular concept based on the identified performance pattern data;

generate a new advertising creative for the particular concept for provision to a search engine provider based on the set of existing advertising creatives, the set of semantic models, and the at least one recommended advertising strategy; and store the new advertising creative using the memory.

2. The system of claim 1, wherein the performance data for advertising creatives comprises campaign specific performance data for specific advertising creatives, associated keywords, and targeting data.

3. The system of claim 2, wherein the performance data for advertising creatives is selected from the group consisting of impressions, click-through rates, and conversion rates.

4. The system of claim 1, wherein generating the new advertising creative comprises modifying one of the advertising creatives from the set of existing advertising creatives based on the at least one recommended advertising strategy.

5. The system of claim 1, wherein the advertising creative generation application further directs the processor to transmit the new advertising creative to a device selected from the group consisting of an advertising server system and a search engine provider system.

6. The system of claim 1, wherein identifying performance pattern data comprises identifying at least one global performance pattern in global performance data, where the global performance data includes performance data for advertising creatives, keywords, and a plurality of advertising strategies across a plurality of existing targeted search advertising campaigns.

7. The system of claim 6, wherein identifying the at least one global performance pattern comprises performing a regression analysis based on the at least one existing advertising strategy and the global performance data.

8. The system of claim 6, wherein generating the at least one recommended advertising strategy comprises generating an advertising strategy that is not included in the set of existing advertising strategies and the global performance data.

9. The system of claim 1, wherein the at least one recommended advertising strategy is generated based on the identified performance pattern data, and a subset of the set of existing advertising creatives.

10. A method for generating advertising creatives, comprising:
obtaining a set of existing advertising creatives for a set of associated concepts and a set of existing advertising strategies using an advertising creative generation device wherein the advertising creative generation device comprises a processor and a memory, and the set of existing advertising creatives and the set of existing advertising strategies are stored using the advertising creative generation device and wherein each of the advertising strategies in the set of existing advertising strategies is based upon a set of sematic models comprising data describing concepts, advertising creatives, and semantic relationships between the concepts and the advertising creatives that is stored in the memory;
determining advertising performance data describing the performance of the set of existing advertising creatives and the set of existing advertising strategies based on performance data associated with the set of existing advertising creative and the set of semantic models upon which the set of advertising strategies is based;
storing the advertising performance data using the advertising creative generation device;
identifying performance pattern data describing at least one performance pattern that describes a pattern between the performance of the set of existing advertising creatives and semantic relationships between the new advertising creatives and the associated concepts using the advertising creative generation device;
storing the performance pattern data using the advertising creative generation device;
generating at least one recommended advertising strategy for a particular concept based on the identified performance pattern data using the advertising creative generation device;
generating a new advertising creative for the particular concept to provide for use by a search engine provider based on the set of existing advertising creatives, the set of semantic models, and the at least one recommended advertising strategy using the advertising creative generation device; and
storing the new advertising creative using the advertising creative generation device.

11. The method of claim 10, wherein the performance data for the set of existing advertising creatives comprises campaign specific performance data for specific advertising creatives in the set of existing advertising creatives and associated keywords and targeting data.

12. The method of claim 11, wherein the performance data for the set of existing advertising creatives is selected from the group consisting of impressions, click-through rates, and conversion rates.

13. The method of claim 10, wherein generating the new advertising creative comprises modifying at least one of the existing advertising creatives based on the at least one recommended advertising strategy.

14. The method of claim 10, further comprising transmitting the new advertising creative to a device using the advertising creative generation device, where the device is selected from the group consisting of an advertising server system and a search engine provider system.

15. The method of claim 10, wherein identifying performance pattern data comprises identifying at least one global performance pattern in global performance data using the advertising creative generation device, where the global performance data includes performance data for advertising creatives, keywords, and a plurality of advertising strategies across a plurality of existing targeted search advertising campaigns.

16. The method of claim 15, wherein identifying the at least one global performance pattern comprises performing a regression analysis based on the at least one existing advertising strategy and the global performance data using the advertising creative generation device.

17. The method of claim 10, wherein generating the at least one recommended advertising strategy comprises generating an advertising strategy that is not included in the set of existing advertising strategies and the global performance data using the advertising creative generation device.

18. The method of claim 10, wherein the at least one recommended advertising strategy is generated based on the identified performance pattern data, and a subset of the set of existing advertising creatives using the advertising creative generation device.

19. The method of claim 10, wherein the semantic relationships between the advertising creatives and the associated concepts comprises a relationship between keywords used in the advertising creatives and attributes describing the associated concepts.

20. The method of claim 19, wherein generating the new advertising creative for the particular concept comprises identifying a new set of keywords to be used with the new advertising creative, wherein the new set of keywords have a similar relationship with the attributes of the particular concept as the semantic relationship between keywords used in the advertising creatives and attributes describing the associated concepts.

\* \* \* \* \*